US011915030B2

United States Patent
Iyer et al.

(10) Patent No.: US 11,915,030 B2
(45) Date of Patent: Feb. 27, 2024

(54) SYSTEM AND METHOD OF APPLICATION TRANSITIONS BETWEEN INFORMATION HANDLING SYSTEMS

(71) Applicant: Dell Products L.P., Round Rock, TX (US)

(72) Inventors: Vivek Viswanathan Iyer, Austin, TX (US); Anantha K. Boyapalle, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 371 days.

(21) Appl. No.: 17/376,857

(22) Filed: Jul. 15, 2021

(65) Prior Publication Data
US 2023/0013509 A1    Jan. 19, 2023

(51) Int. Cl.
*G06F 9/455* (2018.01)
*G06F 9/54* (2006.01)

(52) U.S. Cl.
CPC ...... *G06F 9/45558* (2013.01); *G06F 9/45554* (2013.01); *G06F 9/542* (2013.01); *G06F 2009/45579* (2013.01); *G06F 2009/45591* (2013.01)

(58) Field of Classification Search
CPC .. G06F 9/45558; G06F 9/45554; G06F 9/542; G06F 2009/45579; G06F 2009/45591
See application file for complete search history.

(56) References Cited

U.S. PATENT DOCUMENTS

| | | | |
|---|---|---|---|
| 7,356,679 B1 * | 4/2008 | Le | G06F 16/116 713/1 |
| 11,240,170 B1 * | 2/2022 | Suit | G06F 9/5088 |
| 2003/0131152 A1 * | 7/2003 | Erlingsson | G06F 21/52 719/328 |
| 2011/0289204 A1 * | 11/2011 | Hansson | H04L 67/1008 718/1 |

(Continued)

OTHER PUBLICATIONS

Monitor an Azure Cloud Service (classic) | Microsoft Docs, Retrieved from url: https://docs.microsoft.com/en-us/azure/cloud-services/cloud-services-how-to-monitor, Oct. 14, 2020.

*Primary Examiner* — Dong U Kim
(74) *Attorney, Agent, or Firm* — McDermott Will & Emery LLP

(57) ABSTRACT

In one or more embodiments, one or more systems, one or more methods, and/or one or more processes may: execute a first application within a first operating system (OS) virtualization on a first information handling system (IHS); suspend the first application at a point of execution; determine one or more statuses associated with the first application, in which the one or more statuses includes the point of execution where the first application was suspended; provide the one or more statuses to a second IHS; configure a second application and a second OS virtualization with the one or more statuses associated with the first application within the first OS virtualization; establish input/output associated with the second application with one or more components of the first IHS via the network; and execute the second application within the second OS virtualization on the second IHS at the point of execution.

18 Claims, 10 Drawing Sheets

(56) References Cited

U.S. PATENT DOCUMENTS

| | | | |
|---|---|---|---|
| 2014/0281131 A1* | 9/2014 | Joshi | G06F 12/0804 |
| | | | 711/133 |
| 2014/0297775 A1* | 10/2014 | Davda | G06F 13/28 |
| | | | 709/212 |
| 2017/0185436 A1* | 6/2017 | Deng | G06F 9/45558 |
| 2019/0286475 A1* | 9/2019 | Mani | G06F 9/45558 |
| 2019/0361728 A1* | 11/2019 | Kumar | G06F 9/45558 |

* cited by examiner

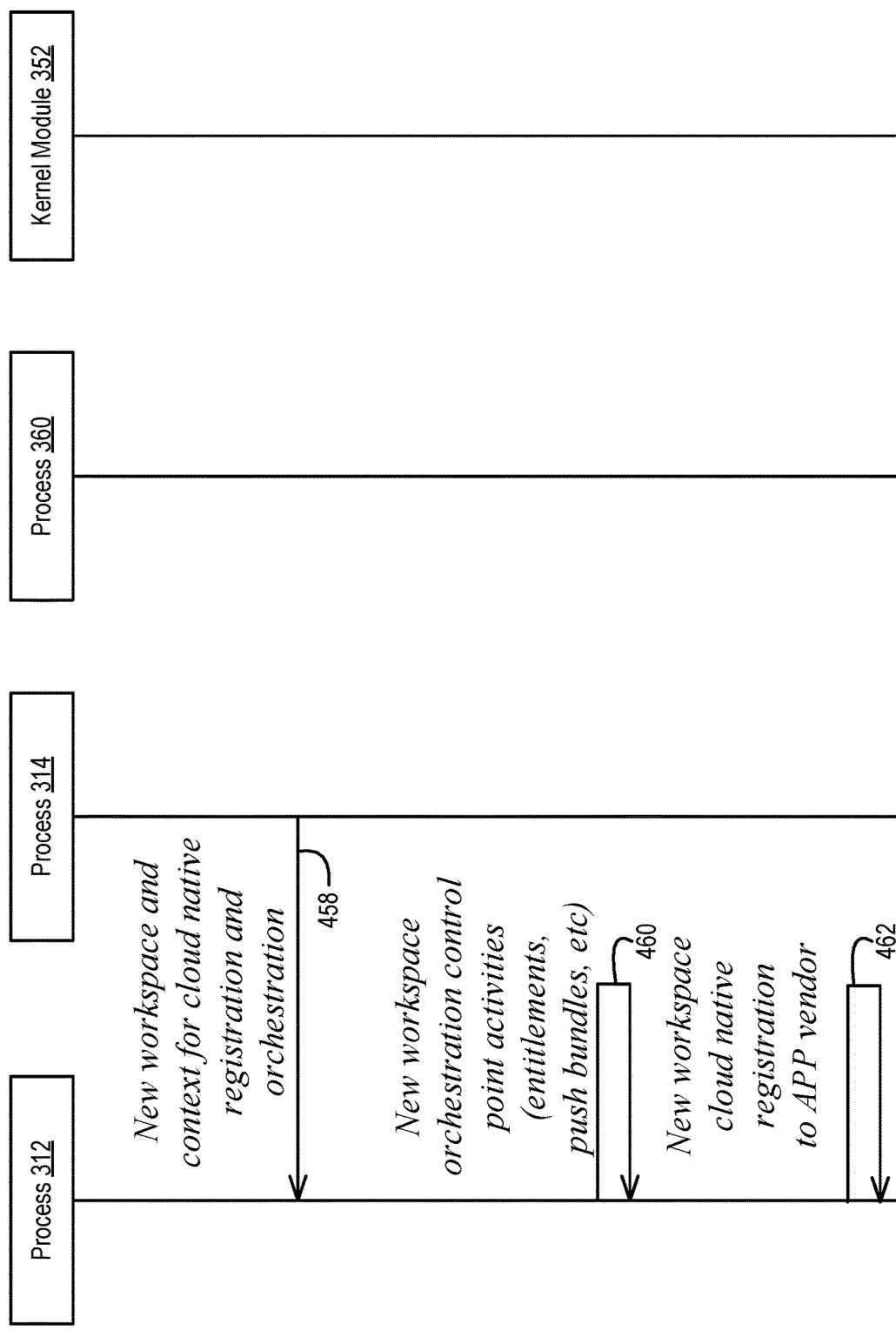

SYSTEM AND METHOD OF APPLICATION TRANSITIONS BETWEEN INFORMATION HANDLING SYSTEMS

BACKGROUND

Field of the Disclosure

This disclosure relates generally to information handling systems and more particularly to application transitions between information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, a first information handling system may execute a first application within a first operating system (OS) virtualization; may determine that a threshold, associated with executing the first application, has been met or exceeded; may suspend the first application at a point of execution; may determine one or more statuses associated with the first application within the first OS virtualization, in which the one or more statuses includes the point of execution where the first application was suspended; and may provide the one or more statuses associated with the first application within the first OS virtualization to a second information handling system via a network.

In one or more embodiments, the second information handling system may configure a second application and a second OS virtualization with the one or more statuses associated with the first application within the first OS virtualization; may establish input/output (I/O) associated with the second application with one or more components of the first information handling system via the network; may execute the second application within the second OS virtualization at the point of execution where the first application was suspended; and may provide, by the second application, data to at least one of the one or more components of the first information handling system via the network.

In one or more embodiments, the first information handling system may execute the first application with a first processor associated with a first instruction set architecture (ISA), and the second information handling system may execute the second application with a second processor associated with a second ISA, different from the first ISA. In one or more embodiments, the first information handling system may further retrieve one or more policies from a policy storage in response to determining that the threshold has been met or exceeded and may further determine that at least one of the one or more policies permits executing the second application on the second information handling system.

In one or more embodiments, the first information handling system may utilize an OS and may include a virtual machine. For example, the virtual machine may include a guest OS. For instance, the virtual machine may include the first OS virtualization, and the first OS virtualization is associated with the guest OS. In one or more embodiments, establishing the I/O associated with the second application with the one or more components of the first information handling system via the network may include establishing the I/O associated with the second application with a kernel driver of the first information handling system.

In one or more embodiments, the one or more components of the first information handling system may include one or more of a display, a keyboard, a pointing device, a universal serial bus (USB) port, an audio input port, a camera, and a biometric input. In one or more embodiments, the second information handling system may further establish the I/O associated with the second application with a graphical user interface executed by the first information handling system. For example, the graphical user interface may include a web browser.

In one or more embodiments, the first information handling system may further receive multiple events associated with executing the first application. For example, determining the one or more statuses associated with the first application may be based at least on the multiple events associated with the executing the first application. In one or more embodiments, the first information handling system may further intercept multiple library subroutine calls. For example, determining the one or more statuses associated with the first application may be based at least on the intercepting the multiple library subroutine calls.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIGS. 4A-4F illustrate an example of a sequence diagram associated with operating a system, according to one or more embodiments.

DETAILED DESCRIPTION

Figure 1:
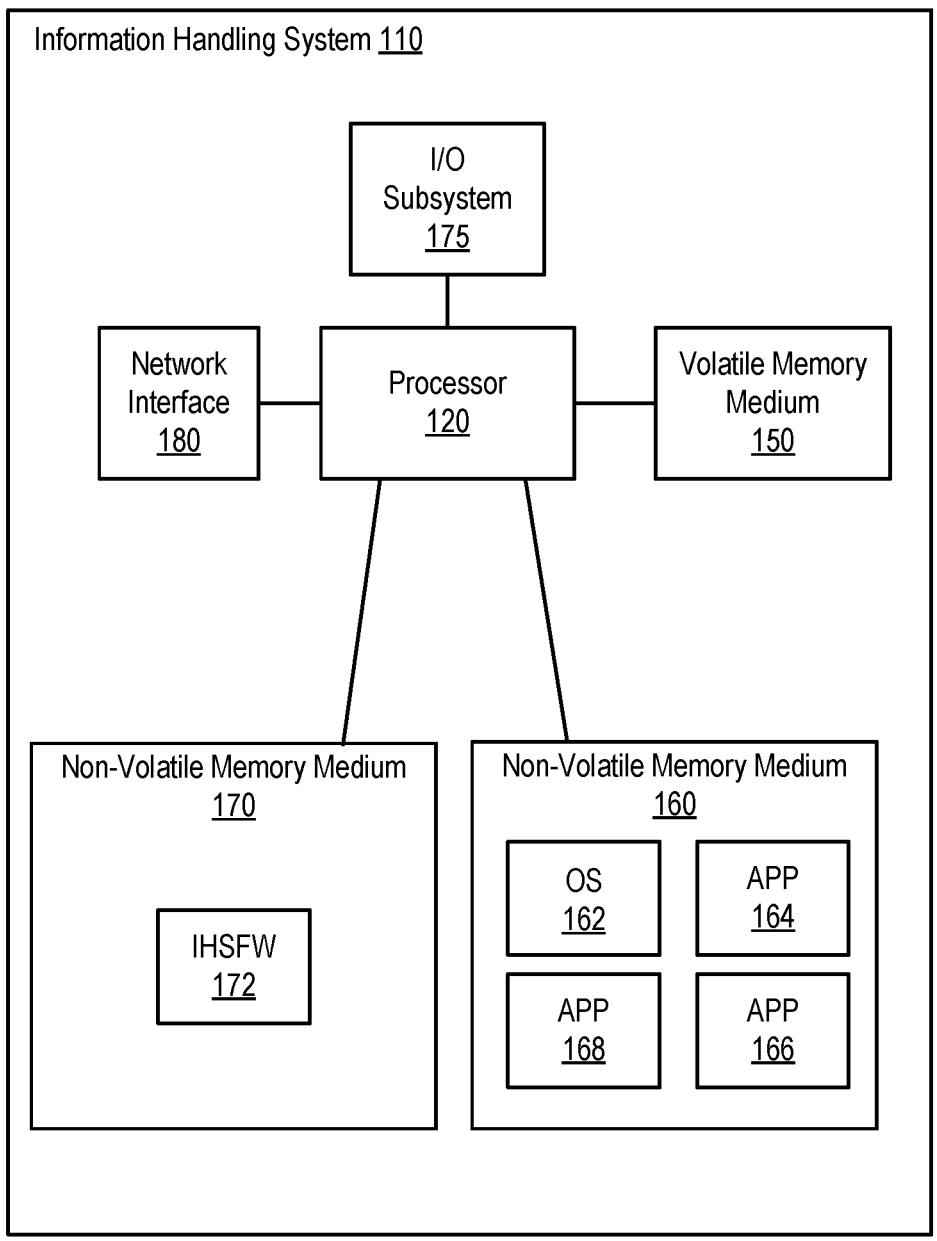
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more systems, one or more methods, and/or one or more processes may orchestrate, optimize, and composite for operating system and silicon-on-chip agnostic user interfaces for clients, while preserving key parts of traditional client experiences. For example, the one or more systems, the one or more methods, and/or the one or more processes may provide a workspace, which may include workloads and/or applications that may execute as cloud-native or endpoint-native. In one instance, a workspace may include a container (e.g., an operating system virtualization). In another instance, a workspace may include a virtual machine. In one or more embodiments, workspace may include one or more policies associated with one or more users of information handling systems. In one or more embodiments, the one or more systems, the one or more methods, and/or the one or more processes may orchestrate workloads with concurrent workspaces of varying performance and security executing on an endpoint (e.g., a user information handling system such as a laptop, a desktop, a workstation, etc.) as well as in a cloud solution.

In one or more embodiments, there may exist a one-to-one relationship between a workspace and an application or a workload, although a workspace may include multiple applications with varying levels of isolation and/or containerization. In one example, a migration of a workspace from cloud-native to endpoint-native may be triggered. In another example, a migration of a workspace from endpoint-native to cloud-native may be triggered. In one or more embodiments, one or more triggers may be invoked based at least on one or more resource limits of use of cloud back-end resources. For example, the one or more resource limits of use of the cloud back-end resources may include one or more aaS ("as a service") billing limits placed on use of cloud back-end resources. In one or more embodiments, a use case may include a lowest tier aaS customer exhausting a budget for cloud usage and being required to move use endpoint for workloads. In one or more embodiments, a use case may include a user that is thermal sensitive and/or acoustics sensitive and may prefer to have more cloud-native usage off an endpoint.

In one or more embodiments, with an aaS model, workloads may migrate back and forth, seamlessly or with-user-permission, between endpoints (e.g., user information handling systems such as laptops, desktops, workstations, etc.) and cloud services without involving reboots, down times for end users, etc. In one or more embodiments, workloads may be migrated to cloud services while one or more updates are performed on one or more endpoints. For example, workloads may be automatically migrated to cloud services when one or more updates to the one or more endpoints trigger those migrations. In one or more embodiments, applications, workloads, and/or workspaces may be seamlessly transitioned from cloud-native to endpoint-native and/or vice-versa. For example, a managed application (e.g., Zoom, MICROSOFT® Word, MICROSOFT® Excel, etc.), with access to video capture device and audio capture device, display, and audio output devices, may be virtualized for workspaces to access.

In one or more embodiments, applications, workloads, and/or workspaces may be non-disruptively transitioned when a user is not impacted (e.g., when the user is not present). For example, when the user is not present, an application may be transitioned from cloud-native to endpoint-native and/or vice-versa. In one or more embodiments, workloads, and/or workspaces may be disruptively transitioned. For example, an office application (e.g., a word processing application, a spreadsheet application, etc.) may be disruptively transitioned from an endpoint to a cloud solution if a user approves the transition. For instance, a pop-up graphical user interface may present the user with a disruptive option for the transition.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
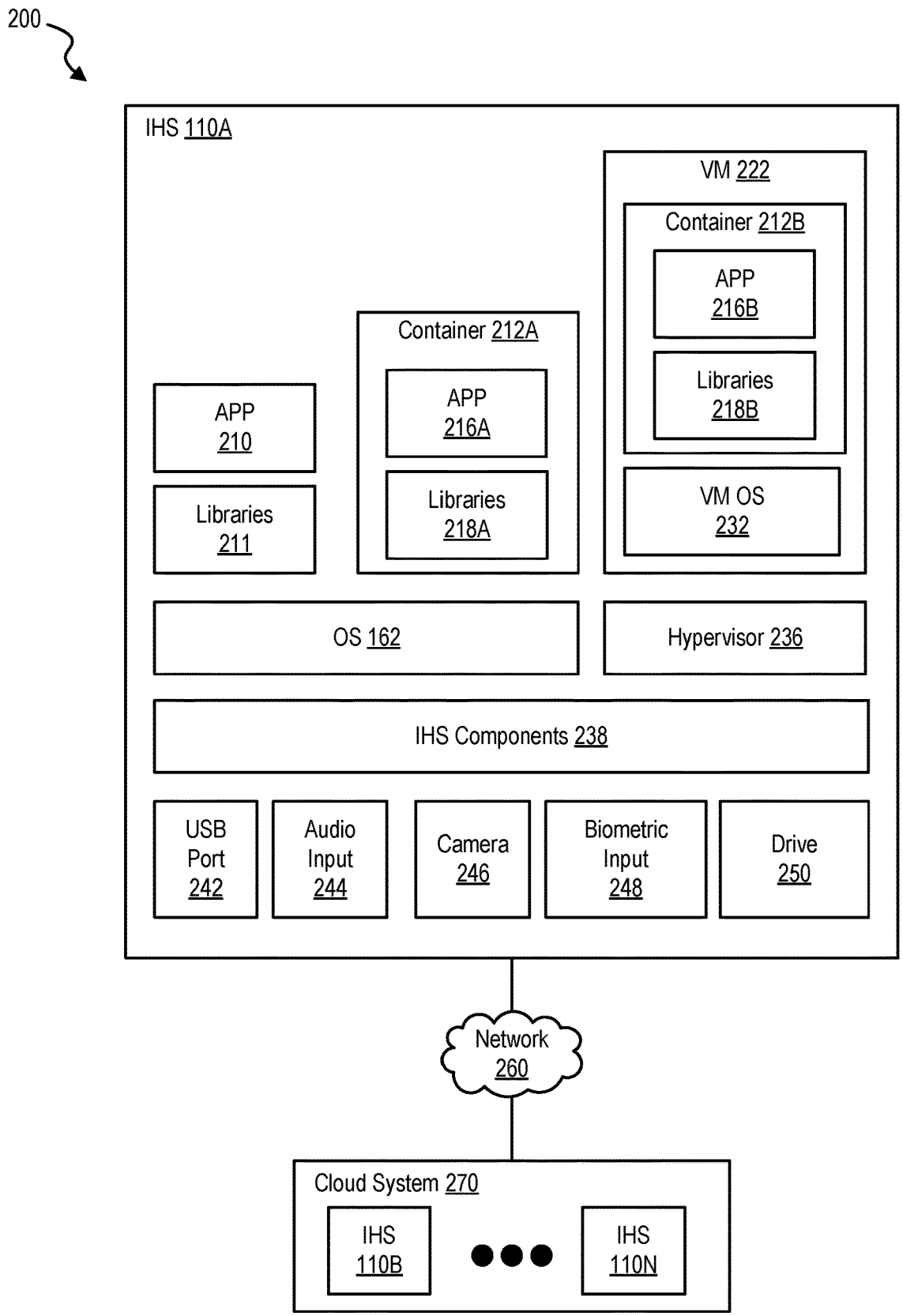
FIG. 2 illustrates an example of a system, according to one or more embodiments.

Turning now to FIG. 2, an example of a system is illustrated, according to one or more embodiments. In one or more embodiments, a system may include an IHS 110A. For example, IHS 110A may include an APP 210. For instance, APP 210 may include APP 164, APP 166, or APP 168, among others. In one or more embodiments, APP 210 may utilize libraries 211. For example, libraries 211 may include one or more libraries associated with OS 162.

In one or more embodiments, IHS 110A may include a container 212A. For example, container 212A may be or include an OS virtualization instance. For instance, container 212A may be in instantiated via OS 162 that is executing natively on IHS 110A. In one or more embodiments, container 212A may include an APP 216A. For example, APP 216A may utilize libraries 218A. In one instance, libraries 218A may include one or more libraries associated with OS 162. In another instance, libraries 218A may include one or more libraries associated with container 212A. In one or more embodiments, APP 216A may be associated with APP 210. In one example, APP 216A may be a copy of APP 210. In another example, APP 216A may be a link to APP 210. In one instance, the link to APP 210 may be a hard link to APP 210. In another instance, the link to APP 210 may be a symbolic link to APP 210.

In one or more embodiments, IHS 110A may include virtual machine (VM) 222. For example, VM 222 may include a container 212B. In one or more embodiments, VM 222 may be or may include MICROSOFT® Azure Hyper-V virtual machine, an ORACLE® VM virtual machine, a Parallels Workstation virtual machine, a VMware Workstation virtual machine, or a VMware Fusion virtual machine, among others.

In one or more embodiments, container 212B may include an APP 216B. For example, APP 216B may utilize libraries 218B. In one instance, libraries 218B may include one or more libraries associated with OS 162. In a second instance, libraries 218B may include one or more libraries associated with a VM OS 232. As an example, VM OS 232 may be an operating system executing on VM 222. In another instance, libraries 218B may include one or more libraries associated with container 212B. In one or more embodiments, container 212B may be or include an OS virtualization instance. For example, container 212B may be in instantiated via VM OS 232 that is executing VM 222. For instance, VM OS 232 may be or may include a guest OS of IHS 110A.

In one or more embodiments, APP 216B may be associated with one or more of APPs 210 and 216A. In one example, APP 216B may be a copy of APP 210. In a second example, APP 216B may be a copy of APP 216A. In another example, APP 216B may be or may include an application that can utilize (e.g., read, write, etc.) data associated with one or more of APPs 210 and 216A.

In one or more embodiments, IHS 110A may include a hypervisor 236. For example, hypervisor 236 may include software and/or firmware that may run one or more virtual machines. For instance, hypervisor 236 may run VM 222. In one or more embodiments, hypervisor 236 may be or may include MICROSOFT® Azure Hyper-V hypervisor, an ORACLE® VM hypervisor, a Parallels Workstation hypervisor, a VMware Workstation hypervisor, or a VMware Fusion hypervisor, among others.

In one or more embodiments, hypervisor 236 may present VM OS 232 (e.g., a guest OS) with a virtual operating platform and/or may manage execution of VM OS 232. For example, hypervisor 236 may include a virtual processor that may execute VM OS 232 and/or APP 216B, among others. In one or more embodiments, VM OS 232 may be or may include OS 162. For example, VM OS 232 may include one or more structures and/or functionalities of OS 162. In one or more embodiments, VM OS 232 may be different from OS 162. In one example, VM OS 232 may be a WINDOWS® operating system, and OS 162 may be a LINUX® operating system. In another example, VM OS 232 may be a LINUX® operating system, and OS 162 may be a WINDOWS® operating system. Various other operating systems may be utilized, according to one or more embodiments. For example, an operating system may include a macOS operating system, a FreeBSD operating system, a NetBSD operating system, an OpenBSD operating system, an AIX operating system, an iOS operating system, an iPadOS operating system, an Android operating system, a HP-UX operating system, a MINIX operating system, or a Solaris operating system, among others.

In one or more embodiments, IHS 110A may include IHS components 238. For example, IHS components 238 may include one or more of processor 120, volatile memory medium 150, non-volatile memory medium 160, non-volatile memory medium 170, I/O subsystem 175, and network interface 180, among others. In one or more embodiments, IHS 110A may one or more of a USB port 242, an audio input port 244 (e.g., a receptacle for a microphone, a microphone, etc.), a camera 246, a biometric input 248 (e.g., a fingerprint scanner), and a drive 250 (e.g., a floppy disk driver, a CD-ROM drive, a CD/RW-drive, a DVD drive, a DVD-RW drive, a Blueray drive, a Blueray-RW drive, etc.). Although not specifically illustrated, IHS components 238 may include one or more of USB port 242, audio input port 244, camera 246, biometric input 248, and drive 250, among others, according to one or more embodiments.

In one or more embodiments, IHS 110A may be communicatively coupled to a network 260. In one or more embodiments, network 260 may include a wired network, a wireless network, an optical network, or a combination of the foregoing, among others. For example, network 260 may include and/or be coupled to various types of communications networks. For instance, network 260 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, system 200 may include network 260. In one or more embodiments, system 200 may not include network 260.

In one or more embodiments, system 200 may include a cloud system 270. For example, cloud system 270 may include information handling systems (IHSs) 110B-110N. For instance, each of one or more of IHSs 110B-110N may include one or more structures and/or one or more functionalities as those described with reference to IHS 110A. In one or more embodiments, cloud system 270 may be communicatively coupled to network 260.

Figure 3:
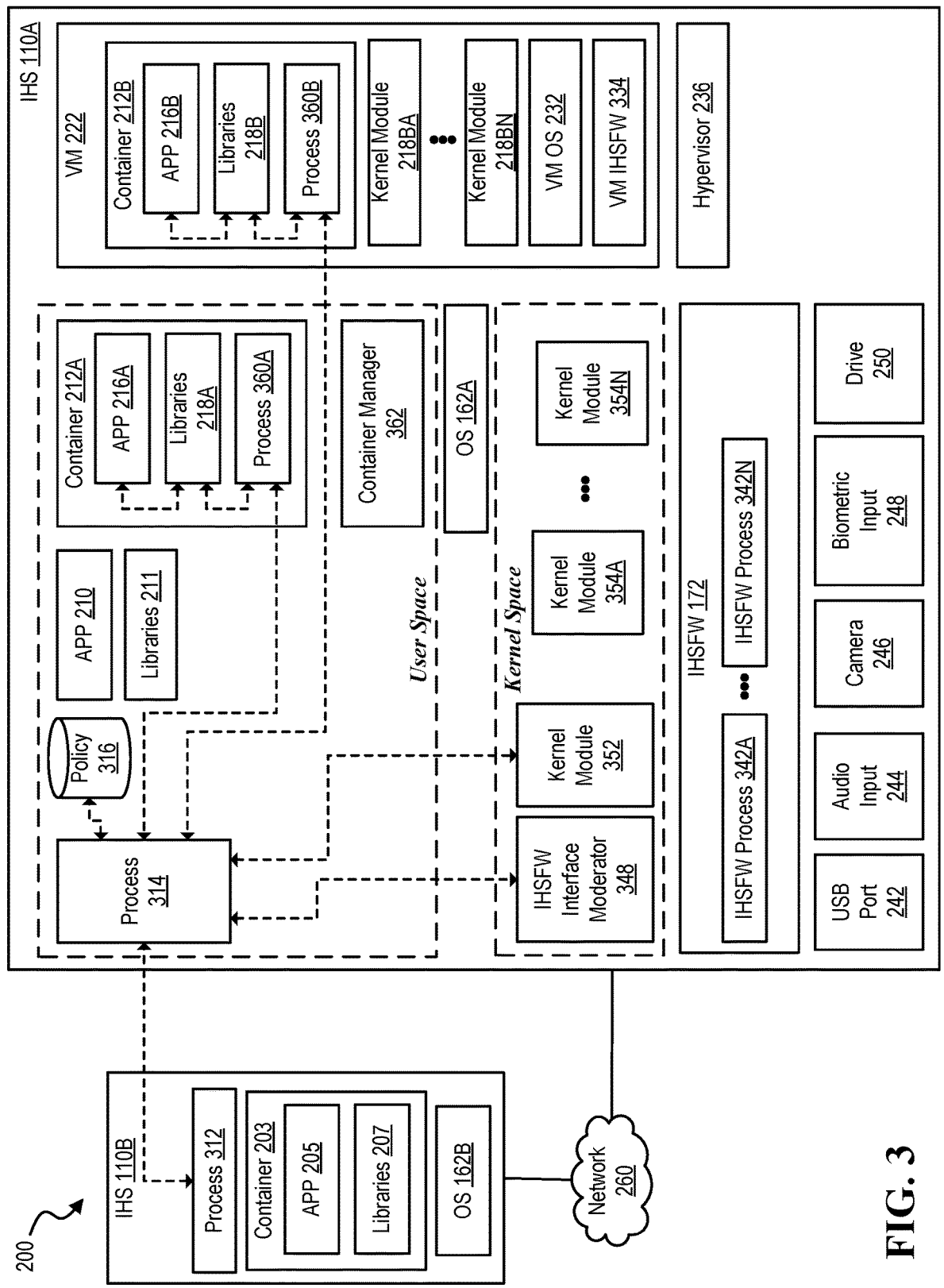
FIG. 3 illustrates another example of a system, according to one or more embodiments.
Figure 4A:
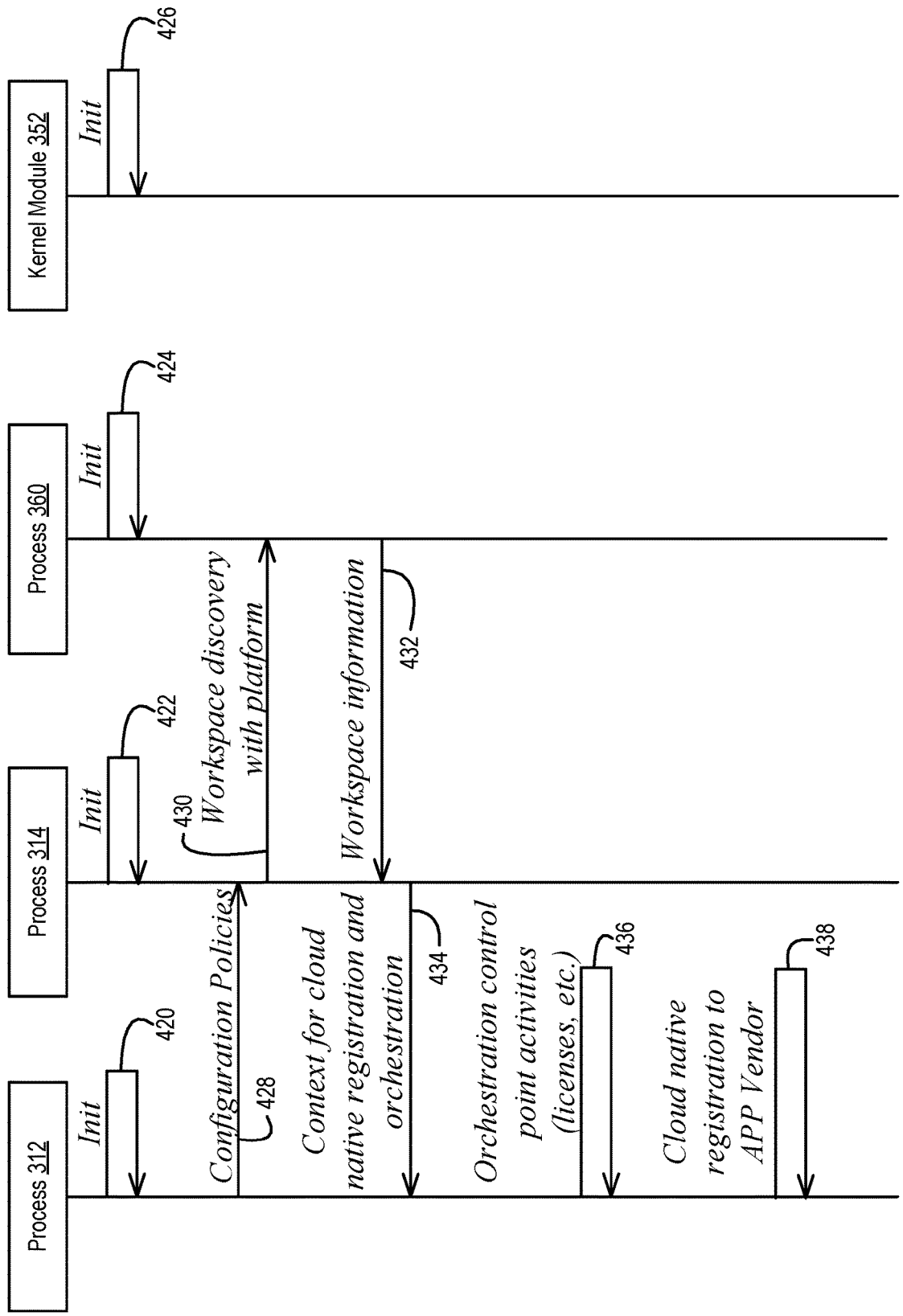
Figure 4B:
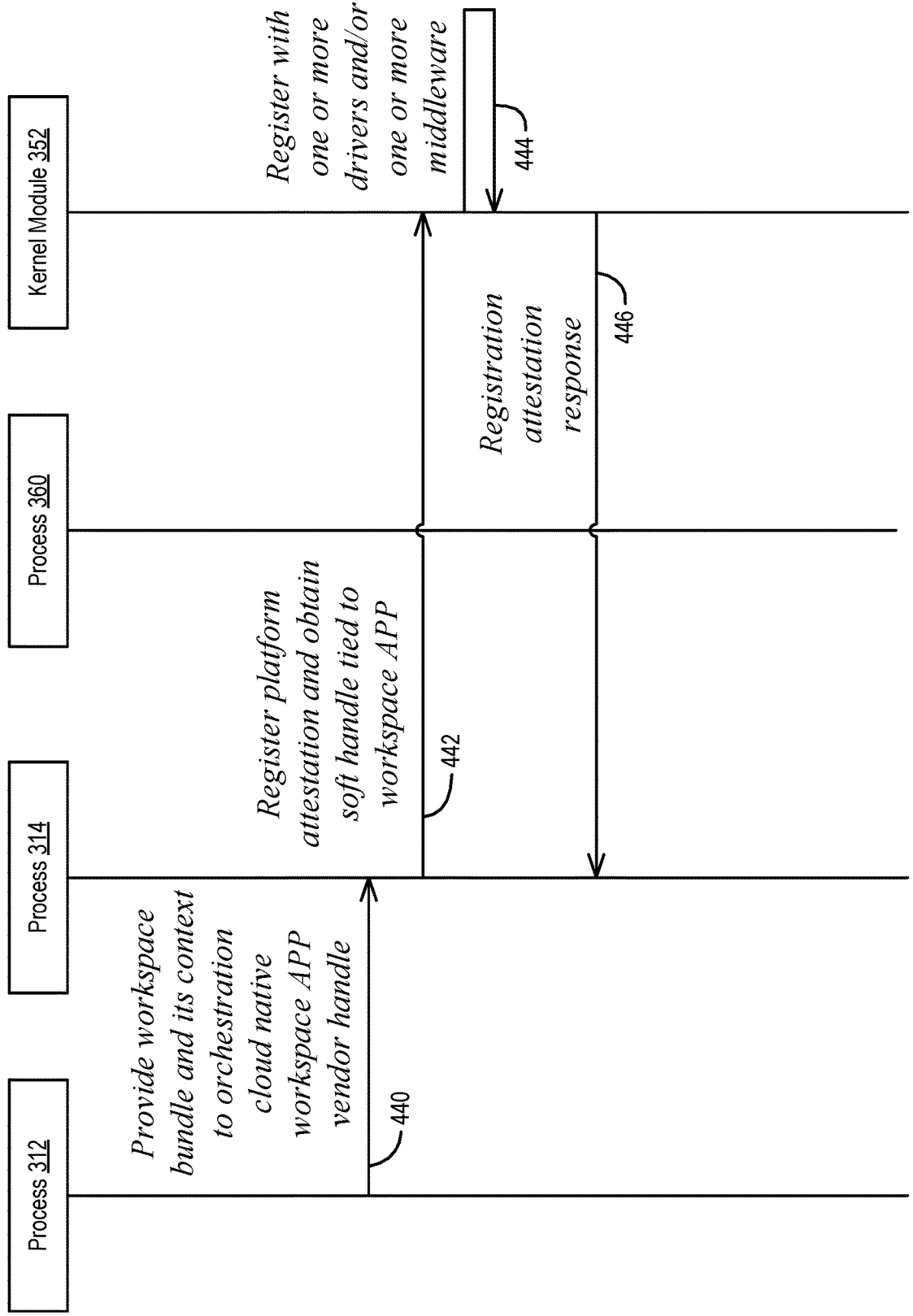
Figure 4C:
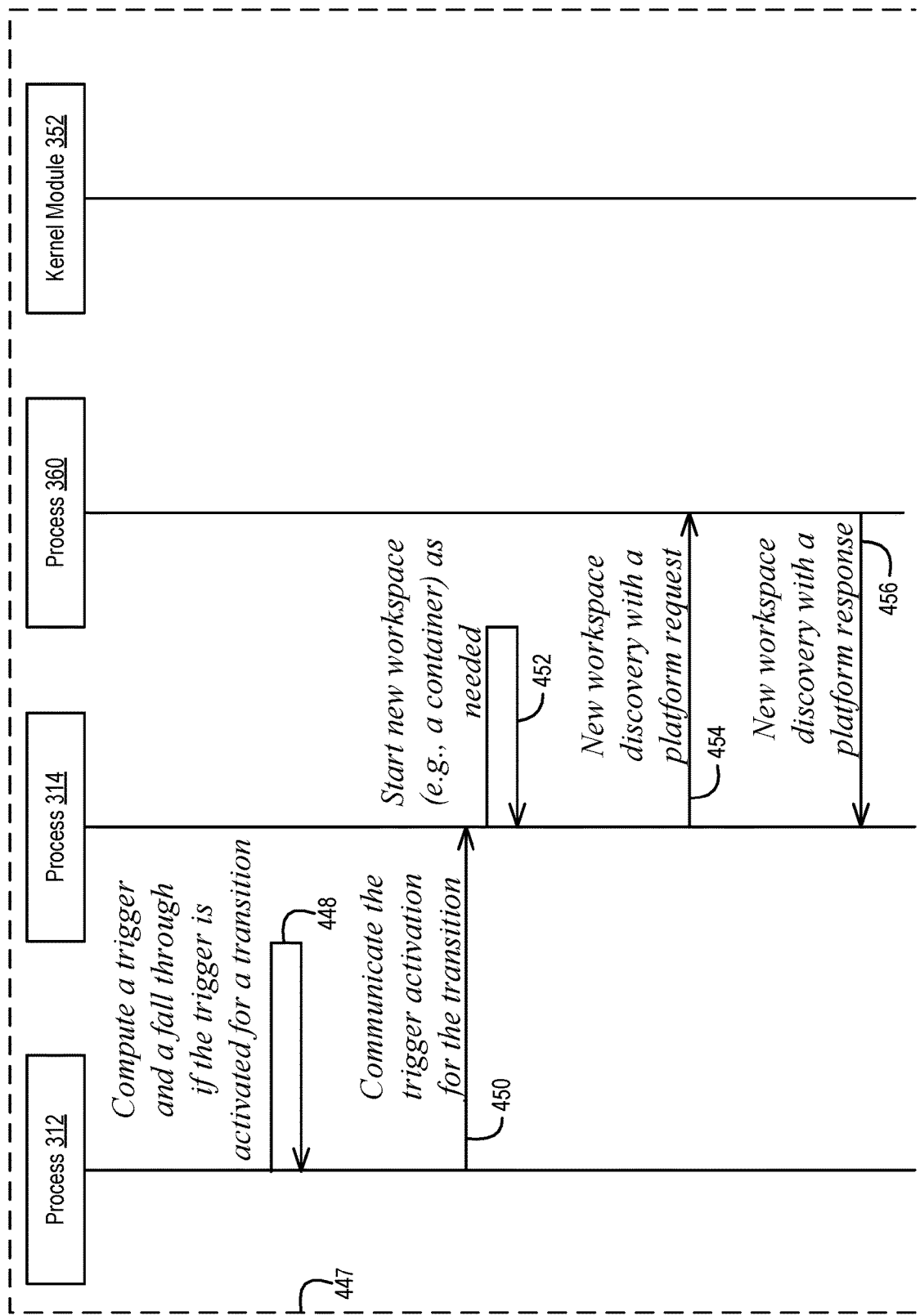
Figure 4E:
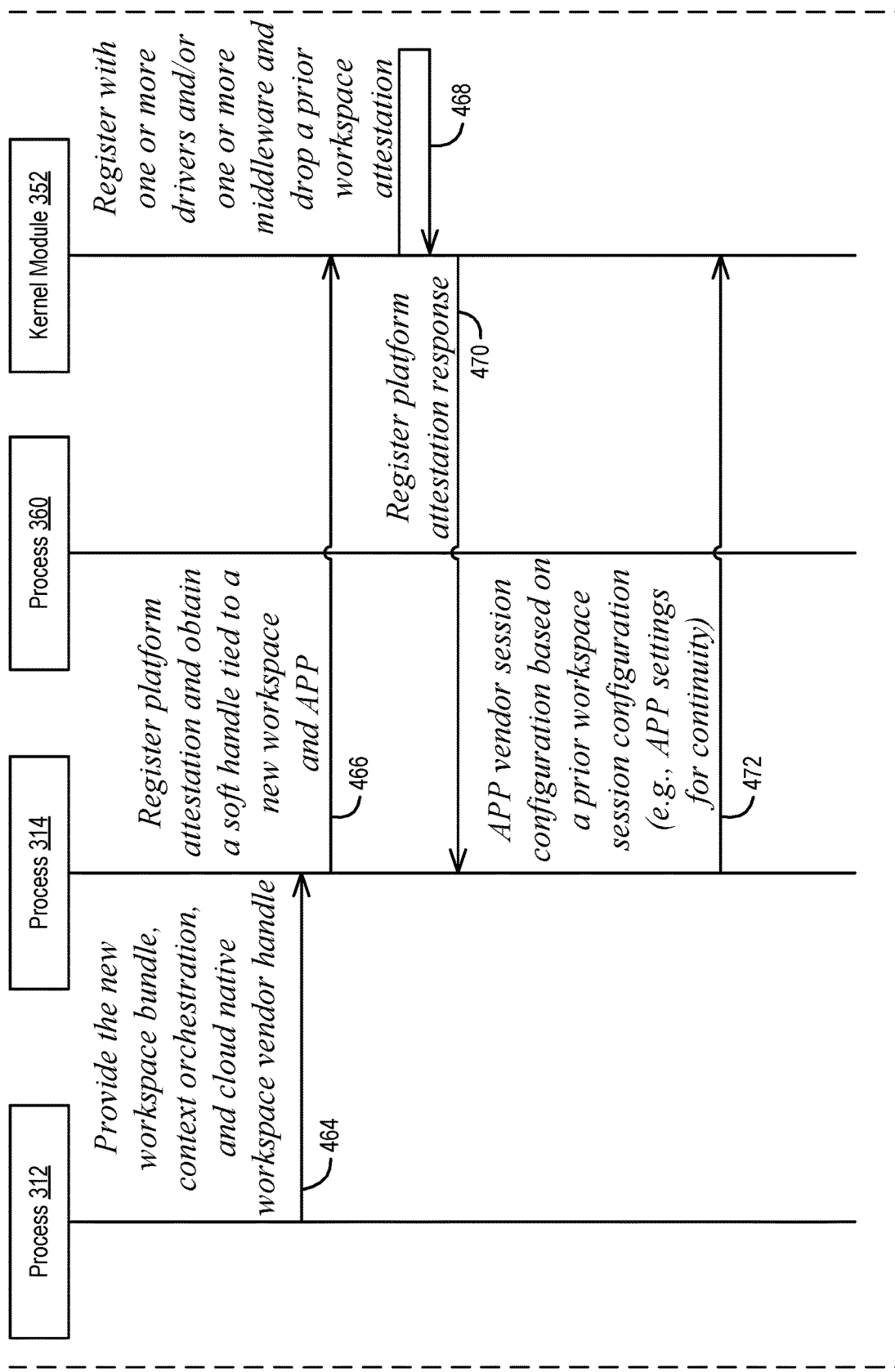
Figure 4F:
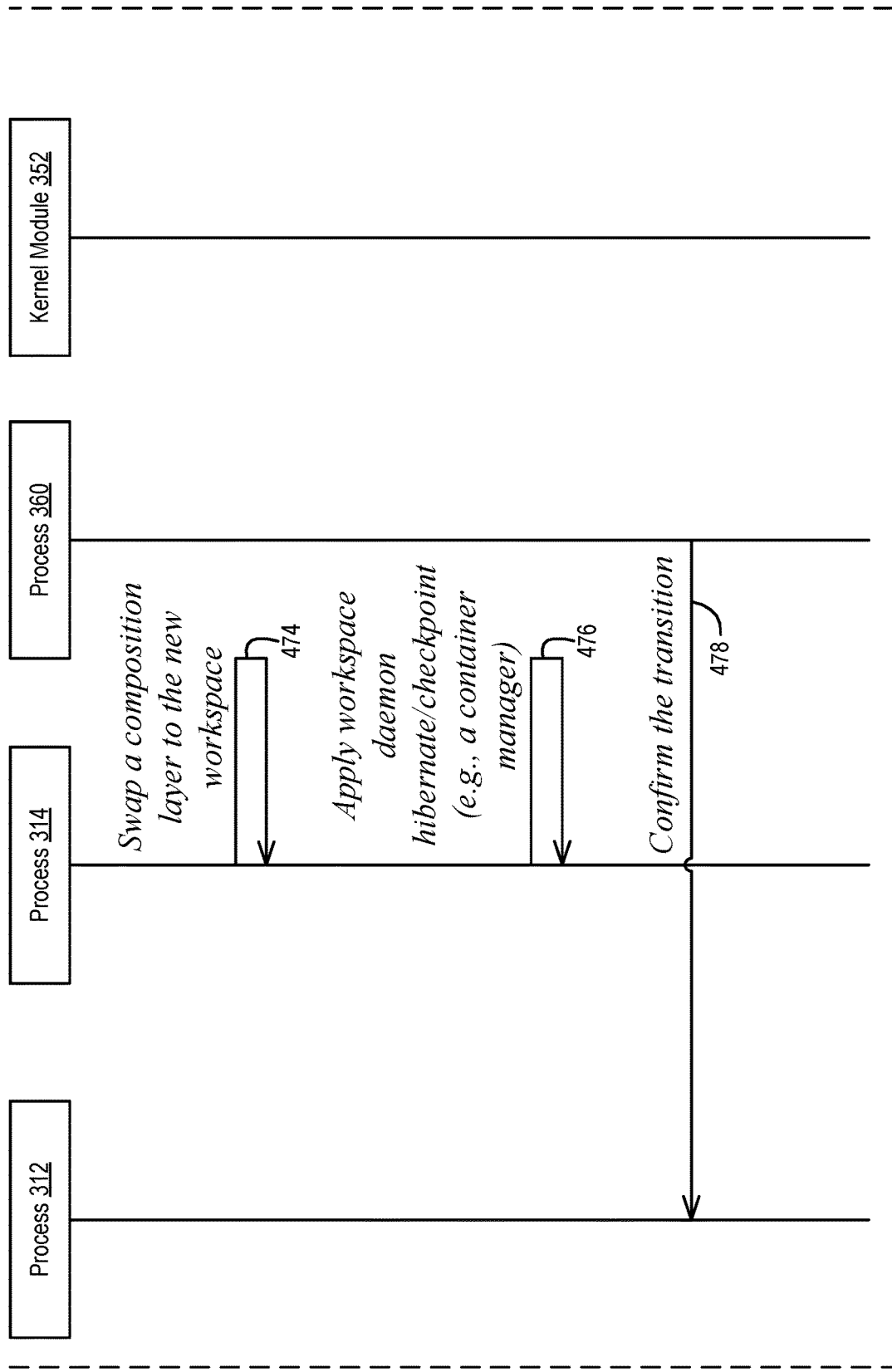

Turning now to FIG. 3, another example of a system is illustrated, according to one or more embodiments. In one or more embodiments, IHS 110B may be communicatively coupled to network 260. In one or more embodiments, IHS 110B may include a process 312. For example, process 312 may include processor instructions that are executable by a processor 120 of IHS 110B to implement at least a portion of one or more systems, at least a portion of one or more flowcharts, at least a portion of one or more methods, and/or at least a portion of one or more processes described herein. In one instance, process 312 may include a service. In a second instance, process 312 may include an application. In another example, process 312 may include a background process.

In one or more embodiments, IHS 110A may include one or more of a process 314, a policy storage 316, and a container manager 362. In one or more embodiments, process 314 may include processor instructions that are executable by a processor 120 of IHS 110A to implement at least a portion of one or more systems, at least a portion of one or more flowcharts, at least a portion of one or more methods, and/or at least a portion of one or more processes described herein. In one instance, process 314 may include a service. In a second instance, process 314 may include an application. In another instance, process 314 may include a background process.

In one or more embodiments, IHS 110A may include user space and kernel space. For example, an operating system may separate virtual memory into kernel space and user space. For instance, separating virtual memory into kernel space and user space may provide memory protection and/or hardware protection from malicious and/or errant software behavior. In one or more embodiments, kernel space may be reserved for executing a privileged operating system kernel, kernel extensions, and/or one or more device drivers, among others. In one or more embodiments, user space may include a memory area in which applications and one or more drivers may be executed. For example, user space (e.g., userland) may refer to all executable processor instructions that are executed outside a kernel of an operating system.

In one or more embodiments, the user space of IHS 110A may include process 314, policy storage 316, APP 210, libraries 211, container 212A, and a container manager 362, among others. In one or more embodiments, the kernel space of IHS 110B may include an IHSFW interface moderator 348, a kernel module 352 and kernel modules 354A-354N, among others. In one or more embodiments, IHSFW 172 may include IHSFW processes 342A-342N, among others.

In one or more embodiments, process 312 may communicate with process 314. For example, process 312 may communicate with process 314 via network 260. In one or more embodiments, process 314 may retrieve first information from policy storage 316 and/or may write second information to policy storage 316. In one or more embodiments, process 314 may communicate with one or more of IHSFW interface moderator 348, kernel module 352, a process 360A of container 212A, and a process 360B of container 212B. In one example, process 360A may include processor instructions that are executable by a processor 120 of IHS 110A to implement at least a portion of one or more systems, at least a portion of one or more flowcharts, at least a portion of one or more methods, and/or at least a portion of one or more processes described herein. In one instance, process 360A may include a service. In a second instance, process 360A may include an application. In another instance, process 360A may include a background process. In another example, process 360B may include processor instructions that are executable by a virtual processor of VM 222 to implement at least a portion of one or more systems, at least a portion of one or more flowcharts, at least a portion of one or more methods, and/or at least a portion of one or more processes described herein. In one instance, process 360B may include a service. In a second instance, process 360B may include an application. In another instance, process 360B may include a background process.

In one or more embodiments, APP 216A may communicate with libraries 218A, and libraries 218A may communicate with process 360A. In one or more embodiments, APP 216B may communicate with libraries 218B, and libraries 218B may communicate with process 360B. In one or more embodiments, VM 222 may include one or more of kernel modules 218BA-218BN, VM OS 232, and VM IHSFW 334, among others. In one or more embodiments, a user of IHS 110A may be utilizing APP 216A. In one or more embodiments, it may be determined that data processing associated with APP 216A is to be transitioned to APP 205. For example, determining that the data processing associated with APP 216A is to be transitioned to APP 205 may include that the data processing associated with APP 216A has met or exceeded one or more thresholds. For instance, the one or more thresholds may include one or more of a temperature value threshold associated with IHS 110A and/or processor 120 of IHS 110A, a processor load threshold associated with processor 120 of IHS 110A, and a memory allocation threshold associated with volatile memory medium 160 of IHS 110A, among others.

In one or more embodiments, 360A may determine one or more statuses associated with APP 216A. For example, the one or more statuses associated with APP 216A may include data associated with APP 216A (e.g., one or more open files, data in volatile memory medium 160 of IHS 110A, one or more open libraries, etc.) and what APP 216A is doing (e.g., where APP 216A is during its execution), among others. In one or more embodiments, process 360A may provide the one or more statuses associated with APP 216A to process 314. For example, process 314 may receive the one or more statuses associated with APP 216A from process 360A.

In one or more embodiments, container 212A may be suspended. For example, process 314 may suspend container 212A. In one or more embodiments, process 314 may provide the one or more statuses associated with APP 216A to process 312. In one or more embodiments, process 312 may allocate a container 203. In one or more embodiments, process 312 may configure container 203. In one example, configuring container 203 may include configuring container 203 with the one or more statuses associated with APP 216A. In another example, configuring container 203 may include configuring container 203 with one or more statuses associated with container 212A.

In one or more embodiments, APP 205 may be executed within container 203. For example, APP 205 may be executed with the one or more statuses associated with APP 216A. In one or more embodiments, APP 205 may process data that was being process by APP 216A. In one or more embodiments, APP 205 may utilize IHS 110A to process I/O associated with APP 205. In one example, APP 205 may utilize a graphical user interface (GUI) of IHS 110A to process I/O associated with APP 205. In one instance, the GUI of IHS 110A may include a web browser. In another instance, the GUI of IHS 110A may a native GUI, which is not a web browser. In another example, APP 205 may utilize one or more of USB port 242, audio input port 244, camera 246, biometric input 248, and drive 250, among others, of IHS 110A. For instance, APP 205 may utilize one or more of USB port 242, audio input port 244, camera 246, biometric input 248, and drive 250, among others, of IHS 110A via one or more of process 314 and kernel module 352, among others.

In one or more embodiments, APP 205 may begin processing data where APP 216A left off. For example, APP 205 may begin executing where APP 216A was suspended. In one or more embodiments, process 314 may execute on IHS 110A as an OS native-endpoint service. For example, process 314 may work in conjunction with a process 360. For instance, process 360 may register and discovery of platform capabilities. In one or more embodiments, process 314 may perform platform side registration of platform capabilities, soft handles for platform attestation needs (e.g., camera input, audio output, etc.). For example, process 314 may utilize kernel module 352 to trap discovery/registration handles for IHS 110A (e.g., camera input device handle, etc.). For instance, kernel module 352 may utilize IPCs to communicate an overall platform handle to securely communicate and/or trap all information handling system oriented attestation (e.g., attestation of devices, memory, resources, etc.).

In one or more embodiments, process 314 may perform orchestration (e.g., back-end), side registration of functional capabilities, and/or soft handles for orchestration needs (e.g., zoom cloud-native app handle/context with appropriately secure IPCs). For example, process 314 may register itself with process 312 to obtain a cloud native handle. For instance, the cloud native handle may be a virtualized handle to call into a control point for a cloud native application. In one or more embodiments, process 314 registering with process 312 may be utilized to obtain one or more configuration policies for manageability. In one or more embodiments, process 314 may enter a wait mode, waiting for trigger from another process and/or a software service, either on IHS 110A or from process 312. For example, the trigger may trigger a transition from workload determination decision.

In one or more embodiments, process 314 may determine if a user is present before performing a transition of a workload and/or a workspace. If the user is present, for example, a user interface may prompt the user to confirm the transition of the workload and/or the workspace. In one or more embodiments, the user interface may interact with a composition service. In one or more embodiments, process 314 may utilize one or more virtualized handles to start another parallel instance of a workspace. In one example, a cloud native application may be transferred from cloud system 270 to IHS 110A. For instance, the cloud native application may be transferred from IHS 110B to IHS 110A. In another example, an endpoint native application (e.g., APP 216A) may be transferred from IHS 110A to cloud system 270. For instance, the endpoint native application (e.g., APP 216A) may be transferred from IHS 110A to IHS 110B.

In one or more embodiments, process 314 may start a parallel instance and hide the parallel instance from a composition layer. In one example, process 314 may trigger the composition layer to generate an alert for a user to confirm a migration. In another example, process 314 may apply another policy that an administrator configured to allow for permitting an action without user interaction with IHS 110A. In one or more embodiments, process 314 may swap a composition handle from a current workspace to a parallel workspace. In one or more embodiments, process 314 may suspend an OS virtualization (e.g., container 212A). For example, when process 314 suspends the OS virtualization, all applications that are executing within the OS virtualization may be suspended. For example, the OS virtualization may include Docker, and a Docker container may be suspended via a Docker checkpoint operation and/or a Docker hibernate operation.

In one or more embodiments, process 360 may be executed within an OS virtualization. In one example, process 360A may be executed within container 212A. In another example, process 360B may be executed within container 212B. In one or more embodiments, process 360 may work in conjunction with process 314 to discover capabilities of IHS 110A by workspace (e.g., an OS virtualization, a container, etc.) applications and/or workloads. In one or more embodiments, process 360 may work in conjunction with process 314 to register capabilities of IHS 110A and/or register soft handles for information handling system attestation (e.g., camera input, audio output, etc.).

In one or more embodiments, process 360 may work in conjunction with process 314 to handle middleware (e.g., INTEL® platform framework, etc.) and/or other information handling system registrations. In one or more embodiments, process 360 may work in conjunction with process 314 to register one or more applications for future manageability interfaces. For example, process 360 may trap and communicate handles to information handling system resources (e.g., a processor, memory, a camera input device, etc.), which may permit migrations and/or transitions of workloads. For instance, process 360 may utilize IPCs in communicating with process 314.

In one or more embodiments, process 360 may receive a transition event to perform a controlled termination and/or a hibernation of an OS virtualization. In one example, process 360A may receive a transition event to perform a controlled termination and/or a hibernation of container 212A. In another example, process 360B may receive a transition event to perform a controlled termination and/or a hibernation of container 212B. In one or more embodiments, process 360 may receive a trigger from process 314 or kernel module 352 to transition an OS virtualization to a suspended state (e.g., a controlled termination and/or a hibernation of the OS virtualization).

In one or more embodiments, kernel module 352 may communicate with process 314 to perform secure attestations to register information handling system entities with capabilities (e.g., a camera driver, middleware, etc.). In one example, kernel module 352 may communicate with process 314 perform secure attestations to register information handling system entities with capabilities when transitioning an application from IHS 110A to cloud system 270 and/or when transitioning an application from cloud system 270 to IHS 110A. In another example, kernel module 352 may communicate with process 314 perform secure attestations to register information handling system entities with capabilities when transitioning an application from IHS 110A to cloud IHS 110B and/or when transitioning an application from IHS 110B to IHS 110A. In one or more embodiments, kernel module 352 may control a transition of soft virtualized handles to information handling system entities from a first workspace to a second workspace. For example, the first workspace may include an application. For instance, utilization of the application may transitioned from the first workspace to the second workspace via kernel module 352.

In one or more embodiments, process 312 may include an orchestration service. For example, process 312 may include back end Dell Web Services orchestration software service. In one or more embodiments, process 312 may serve as a back end orchestration control point for cloud native workload registration to cloud system application programming interfaces (APIs). In one example, the cloud system APIs may be or may include Zoom managed cloud APIs. In another example, the cloud system APIs may be or may include MICROSOFT® Office managed cloud APIs. In one or more embodiments, process 312 may communicate one or more configuration policies of an administrator to workspace settings and/or cloud native virtualized handles to process 314. For example, process 314 may store the one or more configuration policies of the administrator via policy storage 316.

In one or more embodiments, process 312 may provide a trigger to process 314 to swap a particular workspace between cloud native and endpoint native. In one example, process 312 may provide a trigger to process 314 to swap an application between cloud system 270 and IHS 110A. In another example, process 312 may provide a trigger to process 314 to swap an application between IHS 110B and IHS 110A. In one or more embodiments, process 312 may receive an orchestration notification from process 314. For example, process 312 may not control a configuration for a new workspace and/or an existing workspace. In one instance, process 312 may not control billing, licensing, packaged bundles, etc. In another instance, process 312 may not control cloud native handle changes with managed cloud native applications and/or workspaces. In one or more embodiments, process 312 may manage user authorization and authentication of cloud native applications during a transition to maintain a user session across multiple environments. In one example, process 312 may manage the user authorization and authentication of an application during a transition from cloud system 270 to IHS 110A to maintain the user session. In another example, process 312 may manage the user authorization and authentication of an application during a transition from IHS 110B to IHS 110A to maintain the user session.

In one or more embodiments, one or more systems, one or more methods, and/or one or more processes may utilize multiple states. For example, the multiple states may include "S1": discovery of platform capabilities by a workspace (e.g., a container, an operating system virtualization, etc.) applications and/or workloads; "S2": platform side registration of platform capabilities, soft handles for platform attestation needs (e.g., camera input, audio output, etc.); "S3": orchestrator (back-end) side registration of functional capabilities, soft handles for orchestration needs (e.g., application cloud-native application handle and/or context with appropriate secure IPCs; "S4": trigger to perform a transition; "S5": check before confirming a transition; "S6": initiate a swap/transition by starting other instance (cloud-native or endpoint-native); and "S7": perform the swap/transition effectively to another mode for workspace.

Turning now to FIGS. 4A-4F, an example of a sequence diagram associated with operating a system is illustrated, according to one or more embodiments. At 420, process 312 may perform an initialization process. At 422, process 314 may perform an initialization process. At 424, process 360 may perform an initialization process. At 426, kernel module 352 may perform an initialization process. At 428, process 312 may provide one or more configuration policies to process 314. For example, process 314 may receive the one or more configuration policies from process 312. In one or more embodiments, process 312 may retrieve the one or more configuration policies from policy storage 316.

In one or more embodiments, the one or more configuration policies may include one or more permissions associated with an account associated with a user of IHS 110A. In one example, the one or more permissions may be utilized to determine if the account associated with the user of IHS 110A is permitted to copy a file from and/or to one or more of IHS 110A, container 212A, VM 222, and cloud system 270 (e.g., an information handling system of cloud system 270), among others. In another example, the one or more permissions may be utilized to determine if IHS 110A is permitted to copy a file from and/or to one or more of container 212A, VM 222, and cloud system 270 (e.g., an information handling system of cloud system 270), among others. In one or more embodiments, an agent of IHS 110A (e.g., instructions executable by processor 120 of IHS 110A) may enforce the one or more policies.

At 430, process 314 may perform a workspace discovery with process 360. In one or more embodiments, performing the workspace discovery with process 360 may include determining what are one or more requirements and/or one or more resources associated with one or more of containers 212A and 212B. In one or more embodiments, performing the workspace discovery with process 360 may include determining if the account associated with the user of IHS 110A is permitted to utilize an instance of cloud system 270. For example, the instance of cloud system 270 may include one or more of an application and/or a workload associated with APP 216A.

At 432, process 360 may provide workspace information to process 314. For example, process 314 may receive the workspace information from process 360. In one or more embodiments, the workspace information may include information associated with one or more resources associated with one or more of containers 212A and 212B. At 434, process 314 may provide a context for cloud native registration and orchestrations. In one or more embodiments, the context for cloud native registration and orchestrations may include information for APP 205 to execute in place of APP 216A. Although not specifically illustrated, APP 205 may be executed within a container and/or a virtual machine, according to one or more embodiments.

At 436, process 312 may perform one or more orchestration control point activities. In one or more embodiments, the one or more orchestration control point activities may include determining one or more licenses associated with executing APP 205. At 438, process 312 may perform a cloud native registration to an application vendor. In one or more embodiments, the cloud native registration to the application vendor may include registering APP 205 with a vendor of APP 205. For example, registering APP 205 with the vendor of APP 205 may include providing a license associated with APP 205 to the vendor of APP 205.

At 440, a workspace bundle and its context may be provided to an orchestration cloud native workspace application vendor handle. At 442, process 314 may register a platform attestation and obtain a soft handle tied to a workspace application with kernel module 352. In one or more embodiments, the workspace application may include APP 205, APP 216A, or APP 216B. In one or more embodiments, platform attestation may include determining that IHS 110A and/or the workspace is secure.

At 444, kernel module 352 may register with one or more drivers and/or one or more middleware. In one example, the one or more drivers may include one or more of kernel modules 354A-354N. In another example, the one or more middleware may include an INTEL® platform framework. In one or more embodiments, the one or more drivers and/or the one or more middleware may be utilized with one or more of USB port 242, audio input port 244, camera 246, biometric input 248, and drive 250, among others. For example, one or more of APP 205, APP 210, APP 216A, and APP 216A may utilize the one or more drivers and/or the one or more middleware to communicate and/or control the one or more of USB port 242, audio input port 244, camera 246, biometric input 248, and drive 250, among others.

At 446, kernel module 352 may provide a registration attestation response to process 314. In one or more embodiments, a loop 447 may include sequence diagram elements 448-78. At 448, process 312 may compute a trigger and a fall through if the trigger is activated for a transition. In one example, the transition may include a transition of APP 205 to APP 210. In a second example, the transition may include a transition of APP 205 to APP 216A. In another example, the transition may include a transition of APP 205 to APP 216B. In one or more embodiments, a trigger may include user input. For example, the user input may include an actuation of a key of a keyboard, an actuation of a mouse button, a movement of a mouse, a touch to a touchpad, etc. In one or more embodiments, a trigger may include a detection of a user presence. For example, IHS 110A may detect that a user is within a distance of IHS 110A. In one instance, the distance may include one meter, among others. In another instance, the distance may include two meters, among others.

At 450, process 312 may communicate the trigger activation for the transition to process 314. At 452, process 314 may start a new workspace (e.g., a container) as needed. In one example, container 212A may be started as needed. In another example, container 212B may be started as needed. At 454, process 314 may provide a new workspace discovery with a platform request to process 360. At 456, process 360 may provide a workspace discovery with a platform response to process 314.

At 458, process 314 may provide a new workspace and context for cloud native to process 312. At 460, process 312 may perform one or more new workspace orchestration control point activities (entitlements, push bundles, etc.). At 462, process 312 may provide a new workspace cloud native registration to the APP vendor. At 464, process 312 may provide the new workspace bundle, context orchestration, and cloud native workspace vendor handle to process 314. For example, process 314 may receive the new workspace bundle, the context orchestration, and the cloud native workspace vendor handle.

At 466, process 314 may register platform attestation and obtain a soft handle tied to a new workspace and application. At 468, kernel module 352 may register with one or more drivers and/or one or more middleware and may a drop prior workspace attestation. At 470, kernel module 352 may provide a register platform attestation response to process 314. At 472, process 314 may provide an application vendor session configuration based on a prior workspace session configuration (e.g., application settings for continuity) to kernel module 352. At 474, process 314 may swap a composition layer to the new workspace. At 476, process 314 may apply a workspace daemon hibernate/checkpoint (e.g., container manager 362). At 478, process 360 may confirm the transition with process 312.

Figure 5:
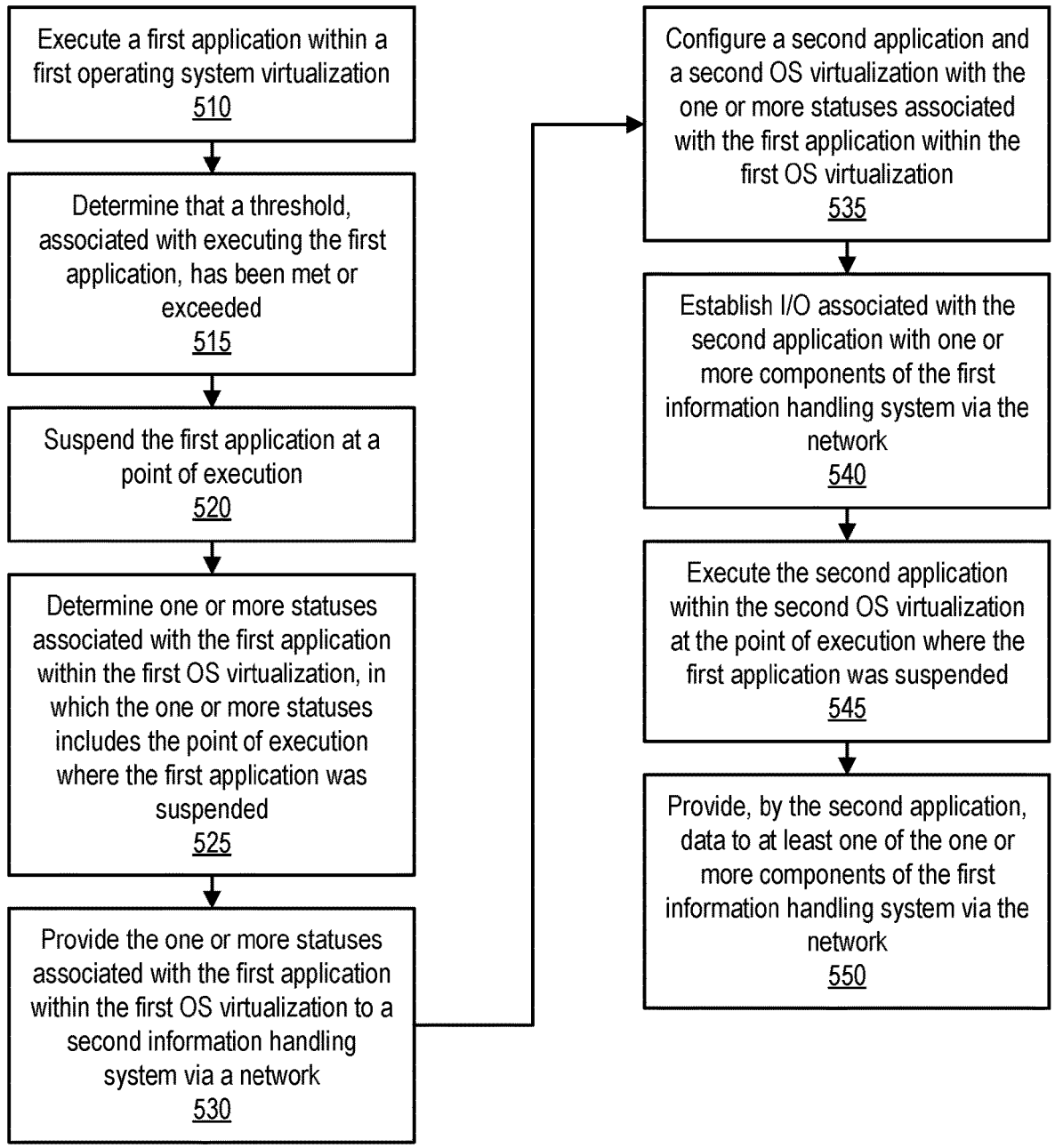
FIG. 5 illustrates an example of a method of operating a system, according to one or more embodiments.

Turning now to FIG. 5, an example of a method of operating a system is illustrated, according to one or more embodiments. At 510, a first application within a first OS virtualization may be executed by a first information handling system. For example, IHS1 10A may execute APP 216 within container 212. At 515, it may be determined that a threshold, associated with executing the first application, has been met or exceeded. For example, IHS1 10A may determine that a threshold, associated with executing APP 216, has been met or exceeded. For instance, the threshold may be a temperature value threshold associated with IHS 110A, a temperature value threshold associated with processor 120 of IHS 110A, a processor load threshold associated with processor 120 of IHS 110A, a memory allocation threshold associated with volatile memory medium 160 of IHS 110A, or a sound pressure level associated with IHS 110A, among others. In one or more embodiments, an information handling system may include one or more sensors that may determine one or more of a temperature value associated with one or more physical portions of the information handling system, a temperature value associated with a processor of the information handling system, and a sound pressure level associated with a physical location within the information handling system, among others.

At 520, the first application may be suspended at a point of execution. For example, IHS 110A may suspend APP 216 at a point of execution. In one or more embodiments, suspending the first application at the point of execution may be performed in response to determining that the threshold has been met or exceeded. In one or more embodiments, the first OS virtualization may be suspended. For example, suspending the first OS virtualization may suspend the first OS virtualization. In one or more embodiments, IHS 110A may include an event listener. In one example, APP 216 may emit events, which may be received by the event listener. For instance, the point of execution may be determined based at least on the events emitted by APP 216. In another example, container 212 may emit events, which may be received by the event listener. For instance, the point of execution may be determined based at least on the events emitted by container 212. In one or more embodiments, the point of execution may be determined based at least on a last event received by the event listener.

At 525, one or more statuses associated with the first application within the first OS virtualization may be determined, in which the one or more statuses includes the point of execution where the first application was suspended. For example, IHS 110A may determine one or more statuses associated with APP 216 within container 212, in which the one or more statuses includes the point of execution where APP 216 was suspended. At 530, the one or more statuses associated with the first application within the first OS virtualization may be provided to a second information handling system via a network. For example, IHS 110A may provide the one or more statuses associated with the first application within the first OS virtualization to IHS 110B via network 260.

At 535, a second application and a second OS virtualization may be configured with the one or more statuses associated with the first application within the first OS virtualization. For example, IHS 110B may configure APP 205 and container 203 with the one or more statuses associated with APP 216 within container 212. At 540, I/O associated with the second application may be established with one or more components of the first information handling system via the network. For example, IHS 110B may establish I/O associated with APP 205 with one or more components of IHS 110A via network 260. For instance, IHS 110B establishing I/O associated with APP 205 with one or more components of IHS 110A via network 260 may permit APP 205 to utilize I/O of IHS 110A as APP 216 utilized I/O of IHS 110A.

At 545, the second application may be executed within the second OS virtualization on the second information handling system at the point of execution where the first application was suspended. For example, IHS 110B may execute APP 205 within container 203 at the point of execution where APP 210 was suspended. At 550, data may be provided, by the second application, to at least one of the one or more components of the first information handling system via the network. For example, IHS 110B may provide, by APP 205, data to at least one of the one or more components of IHS 110A via network 260. In one instance, the data may include display data, and IHS 110A may display, via a display, the display data from APP 205. In another instance, IHS 110B may provide, by APP 205, data to at least one of USB port 242 and drive 250 via network 260. In one or more embodiments, IHS 110B may receive, by APP 205, data from at least one of the one or more components of IHS 110A via network 260. For example, IHS 110B may receive, by APP 205, data from at least one of USB port 242, audio input 244, camera 246, biometric input 248, and drive 250 via network 260.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
a plurality of information handling systems;
wherein a first information handling system of the plurality of information handling systems is configured to:
  execute a first application within a first operating system (OS) virtualization;
  determine that i) a temperature threshold, associated with executing the first application, has been met or exceeded and ii) a sound pressure level threshold, associated with executing the first application, has been met or exceeded;
  in response to determining that i) the temperature threshold has been met or exceeded and ii) the sound pressure level threshold has been met or exceeded, suspend the first application at a point of execution;
  determine one or more statuses associated with the first application within the first OS virtualization, wherein the one or more statuses includes the point of execution where the first application was suspended; and
  provide the one or more statuses associated with the first application within the first OS virtualization to a second information handling system of the plurality of information handling systems via a network; and
wherein the second information handling system is configured to:
  configure a second application and a second OS virtualization with the one or more statuses associated with the first application within the first OS virtualization;
  establish input/output (I/O) associated with the second application with one or more components of the first information handling system via the network;
  execute the second application within the second OS virtualization at the point of execution where the first application was suspended; and
  provide, by the second application, data to at least one of the one or more components of the first information handling system via the network.

2. The system of claim 1,
wherein the first information handling system includes a first processor associated with a first instruction set architecture (ISA);
wherein the first information handling system executes the first application with the first processor associated with the first ISA;
wherein the second information handling system includes a second processor associated with a second ISA, different from the first ISA; and wherein the second information handling system executes the second application with the second processor associated with the second ISA.

3. The system of claim 1, wherein the first information handling system is further configured to:
in response to determining that the threshold has been met or exceeded, retrieve one or more policies from a policy storage; and
determine that at least one of the one or more policies permits executing the second application on the second information handling system.

4. The system of claim 1,
wherein the first information handling system utilizes an OS;
wherein the first information handling system includes a virtual machine;
wherein the virtual machine utilizes a guest OS;
wherein the virtual machine includes the first OS virtualization; and
wherein the first OS virtualization is associated with the guest OS.

5. The system of claim 1, wherein, to establish the I/O associated with the second application with the one or more components of the first information handling system via the network, the second information handling system is further configured to establish the I/O associated with the second application with a kernel driver of the first information handling system.

6. The system of claim 1, wherein the one or more components of the first information handling system includes one or more of a display, a keyboard, a pointing device, a universal serial bus (USB) port, an audio input port, a camera, and a biometric input.

7. The system of claim 1, wherein the second information handling system is further configured to:
establish the I/O associated with the second application with a graphical user interface executed by the first information handling system.

8. The system of claim 7, wherein the graphical user interface includes a web browser.

9. The system of claim 1,
wherein the first information handling system is further configured to receive a plurality of events associated with the executing the first application; and
wherein, to determine the one or more statuses associated with the first application, the first information handling system is further configured to determine the one or more statuses associated with the first application based at least on the plurality of events associated with executing the first application.

10. A method, comprising:
executing a first application within a first operating system (OS) virtualization on a first information handling system;
determining that La temperature threshold, associated with executing the first application, has been met or exceeded and ii) a sound pressure level threshold, associated with executing the first application, has been met or exceeded;
in response to the determining that i) the temperature threshold has been met or exceeded and ii) the sound pressure level threshold has been met or exceeded, suspending the first application at a point of execution;
determining one or more statuses associated with the first application within the first OS virtualization, wherein the one or more statuses includes the point of execution where the first application was suspended;
providing the one or more statuses associated with the first application within the first OS virtualization to a second information handling system via a network;
configuring a second application and a second OS virtualization with the one or more statuses associated with the first application within the first OS virtualization;
establishing input/output (I/O) associated with the second application with one or more components of the first information handling system via the network;
executing the second application within the second OS virtualization on the second information handling system at the point of execution where the first application was suspended; and
providing, by the second application, data to at least one of the one or more components of the first information handling system via the network.

11. The method of claim 10,
wherein the first information handling system executes the first application with a first processor associated with a first instruction set architecture (ISA); and
wherein the second information handling system executes the second application with a second processor associated with a second ISA, different from the first ISA.

12. The method of claim 10, further comprising:
in response to the determining that the threshold has been met or exceeded, retrieving one or more policies from a policy storage; and
determining that at least one of the one or more policies permits executing the second application on the second information handling system.

13. The method of claim 10,
wherein the first information handling system utilizes an OS;
wherein the first information handling system includes a virtual machine;
wherein the virtual machine utilizes a guest OS;
wherein the virtual machine includes the first OS virtualization; and
wherein the first OS virtualization is associated with the guest OS.

14. The method of claim 10, wherein the establishing the I/O associated with the second application with the one or more components of the first information handling system via the network includes establishing the I/O associated with the second application with a kernel driver of the first information handling system.

15. The method of claim 10, wherein the one or more components of the first information handling system includes one or more of a display, a keyboard, a pointing device, a universal serial bus (USB) port, an audio input port, a camera, and a biometric input.

16. The method of claim 10, further comprising:
establishing the I/O associated with the second application with a graphical user interface executed by the first information handling system.

17. The method of claim 16, wherein the graphical user interface includes a web browser.

18. The method of claim 10, further comprising:
receiving a plurality of events associated with the executing the first application;
wherein the determining the one or more statuses associated with the first application is based at least on the plurality of events associated with the executing the first application.

* * * * *